US012028383B2

(12) United States Patent
Kuravangi-Thammaiah et al.

(10) Patent No.: US 12,028,383 B2
(45) Date of Patent: *Jul. 2, 2024

(54) SYSTEMS AND METHODS FOR SUPPORTING INTERNET PROTOCOL MULTIMEDIA SUBSYSTEM SERVICES IN FIFTH-GENERATION NETWORKS

(71) Applicant: Verizon Patent and Licensing Inc., Basking Ridge, NJ (US)

(72) Inventors: Shanthala Kuravangi-Thammaiah, Keller, TX (US); Lalit R. Kotecha, San Ramon, CA (US); Jodi A. Kelm, Miltona, MN (US); Robert Avanes, Roanoke, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/189,252

(22) Filed: Mar. 24, 2023

(65) Prior Publication Data

US 2023/0254348 A1 Aug. 10, 2023

Related U.S. Application Data

(63) Continuation of application No. 17/650,585, filed on Feb. 10, 2022, now Pat. No. 11,632,403.

(51) Int. Cl.
*G06F 13/00* (2006.01)
*H04L 65/1016* (2022.01)
*H04L 65/1069* (2022.01)
*H04L 65/1073* (2022.01)
*H04L 65/1104* (2022.01)

(52) U.S. Cl.
CPC ...... *H04L 65/1016* (2013.01); *H04L 65/1069* (2013.01); *H04L 65/1073* (2013.01); *H04L 65/1104* (2022.05)

(58) Field of Classification Search
CPC .......... H04L 65/1016; H04L 65/1069; H04L 65/1073; H04L 65/1104; H04L 65/1046
USPC ................. 709/224, 220–222, 230, 227–229
See application file for complete search history.

(56) References Cited

U.S. PATENT DOCUMENTS

| | | | |
|---|---|---|---|
| 8,295,158 B2 | 10/2012 | Li et al. | |
| 8,359,015 B2 | 1/2013 | Swaminathan et al. | |
| 9,565,216 B2 * | 2/2017 | Khalil | H04W 12/08 |
| 10,694,367 B1 | 6/2020 | Sharma et al. | |
| 11,632,403 B1 * | 4/2023 | Kuravangi-Thammaiah | |
| | | | H04L 65/1069 |
| | | | 709/224 |

(Continued)

*Primary Examiner* — Kenneth R Coulter

(57) ABSTRACT

A network device may receive, from a CSCF device, a request for registration data associated with an IMS service, and may provide, to the CSCF device, the registration data associated with the IMS service. The network device may receive, from the CSCF device, a request for location data associated with the IMS service, and may provide, to the CSCF device, the location data associated with the IMS service. The network device may receive, from the CSCF device, a request for authentication data associated with the IMS service, and may provide, to the CSCF device, the authentication data associated with the IMS service. The network device may receive, from the CSCF device, a request for subscriber profile data associated with the IMS service, and may provide, to the CSCF device, the subscriber profile data associated with the IMS service.

20 Claims, 10 Drawing Sheets

(56) References Cited

U.S. PATENT DOCUMENTS

2008/0160996 A1 7/2008 Li et al.
2011/0028130 A1 2/2011 Swaminathan et al.
2016/0119378 A1* 4/2016 Khalil ................ H04L 65/1016
  726/14

* cited by examiner

SYSTEMS AND METHODS FOR SUPPORTING INTERNET PROTOCOL MULTIMEDIA SUBSYSTEM SERVICES IN FIFTH-GENERATION NETWORKS

RELATED APPLICATION

This application is a continuation of U.S. patent application Ser. No. 17/650,585 (now U.S. Pat. No. 11,632,403), entitled "SYSTEMS AND METHODS FOR SUPPORTING INTERNET PROTOCOL MULTIMEDIA SUBSYSTEM SERVICES IN FIFTH-GENERATION NETWORKS," filed Feb. 10, 2022, which is incorporated herein by reference in its entirety.

BACKGROUND

A user device (e.g., a mobile terminal or a user equipment (UE)) may access Internet protocol (IP) multimedia subsystem (IMS) services via a core network.

DETAILED DESCRIPTION OF EXAMPLE EMBODIMENTS

Figure 1A:
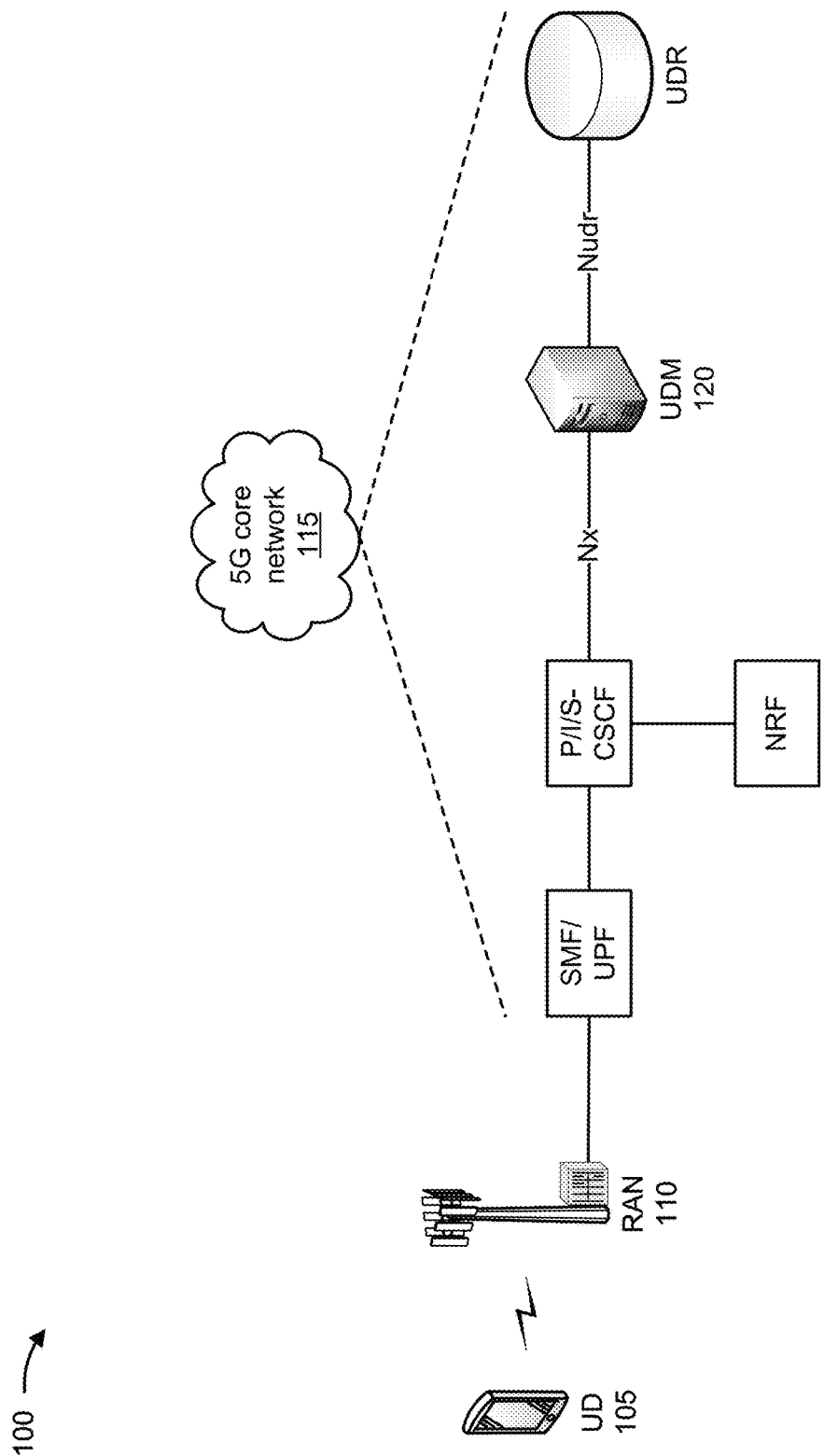
FIGS. 1A-1G are diagrams of an example associated with supporting IMS services in 5G networks.

The following detailed description of example implementations refers to the accompanying drawings. The same reference numbers in different drawings may identify the same or similar elements.

A home subscriber server (HSS) of a fourth-generation (4G) network may enable a user device to access IMS services. When a user device requests an IMS service (e.g., a voice-over-IP (VoIP) service, an IMS messaging service, and/or the like), a call session control function (CSCF) of the 4G network obtains information from the HSS in order to enable the user device to access the IMS service. In a fifth-generation (5G) network, the CSCF does not communicate with a unified data management (UDM) device and cannot utilize the UDM device to enable the user device to access the IMS service. Current techniques co-locate the HSS with the UDM or integrate the HSS within the UDM. However, such arrangements require the CSCF to query the HSS in order to reach the UDM and obtain support for enabling the user device to access the IMS service. Thus, a network provider may be required to provide and maintain a first type of HSS for a 4G network and a second type of HSS for a 5G network.

Thus, current techniques for enabling a user device to access an IMS service consume computing resources (e.g., processing resources, memory resources, communication resources, and/or the like), networking resources, and/or other resources associated with failing to provide IMS services to a user device associated with a 5G network, providing and maintaining two types of HSSs for a 4G network and a 5G network, causing additional communications between the HSS and the UDM device to enable the CSCF to communicate with the UDM device, and/or the like.

Some implementations described herein provide a network device (e.g., a UDM device) that supports IMS services in 5G networks. For example, the UDM device may establish a communication interface with a CSCF device, and may receive, via the communication interface and from the CSCF device, a request for registration data associated with an IMS service requested by a user device. The UDM device may provide, to the CSCF device and based on the request, the registration data associated with the IMS service, and may receive, via the communication interface and from the CSCF device, a request for location data associated with the IMS service. The UDM device may provide, to the CSCF device and based on the request, the location data associated with the IMS service, and may receive, via the communication interface and from the CSCF device, a request for authentication data associated with the IMS service. The UDM device may provide, to the CSCF device and based on the request, the authentication data associated with the IMS service, and may receive, via the communication interface and from the CSCF device, a request for subscriber profile data associated with the IMS service. The UDM device may provide, to the CSCF device and based on the request, the subscriber profile data associated with the IMS service.

In this way, the UDM device supports IMS services in 5G networks. For example, the UDM device may be enhanced to support an interface with the CSCF. The interface may be utilized to provide registration data, location data, authentication data, subscriber profile data, and/or the like, associated with an IMS service, to the CSCF. The CSCF may utilize the registration data, the location data, the authentication data, the subscriber profile data, and/or the like to enable a user device to register for and access the IMS service. Thus, the UDM device may conserve computing resources, networking resources, and/or other resources that would have otherwise been consumed by failing to provide IMS services to a user device associated with a 5G network, providing and maintaining two types of HSSs for a 4G network and a 5G network, causing additional communications between the HSS and the UDM device to enable the CSCF to communicate with the UDM device, and/or the like.

FIGS. 1A-1G are diagrams of an example 100 associated with supporting IMS services in 5G networks. As shown in FIGS. 1A-1G, example 100 includes a user device (UD) 105, a radio access network (RAN) 110, and a core network 115 (e.g., a 5G core network). The core network 115 may include a session management function (SMF)/user plane function (UPF), a P/I/S-CSCF (e.g., a proxy CSCF or P-CSCF, an interrogating CSCF or I-CSCF, and a serving CSCF or S-CSCF), a network resource function (NRF), a UDM device 120 (also referred to as the UDM 120), and a unified data repository (UDR). Further details of the user device 105, the RAN 110, the core network 115, the SMF/UPF, the P/I/S-CSCF, the NRF, the UDM 120, and the UDR are provided elsewhere herein.

As shown in FIG. 1A, the user device 105 may communicate with the core network 115 via the RAN 110. The P/I/S-CSCF may communicate with the SMF/UPF and the NRF via communication interfaces. As further shown in FIG. 1A, a new communication interface Nx (e.g., a service-based interface or SBI) may be established between the P/I/S-CSCF and the UDM 120 to enable the P/I/S-CSCF to communicate with the UDM 120. The UDM 120 may be enhanced to support the SBI Nx with the P/I/S-CSCF, and may utilize the SBI Nx to receive requests for registration data, location data, authentication data, subscriber profile data, and/or the like for IMS services (e.g., a VoIP service, an IMS messaging service, and/or the like) from the P/I/S-CSCF, and to provide the registration data, the location data, the authentication data, the subscriber profile data, and/or the like to the P/I/S-CSCF, as described below in connection with FIGS. 1B-1G. As further shown in FIG. 1A, the UDM 120 may communicate with the UDR via a communication interface Nudr. The UDR may include a data structure (e.g., a database, a table, a list, and/or the like) that stores the registration data, the location data, the authentication data, the subscriber profile data, and/or the like for IMS services.

Figure 1B:
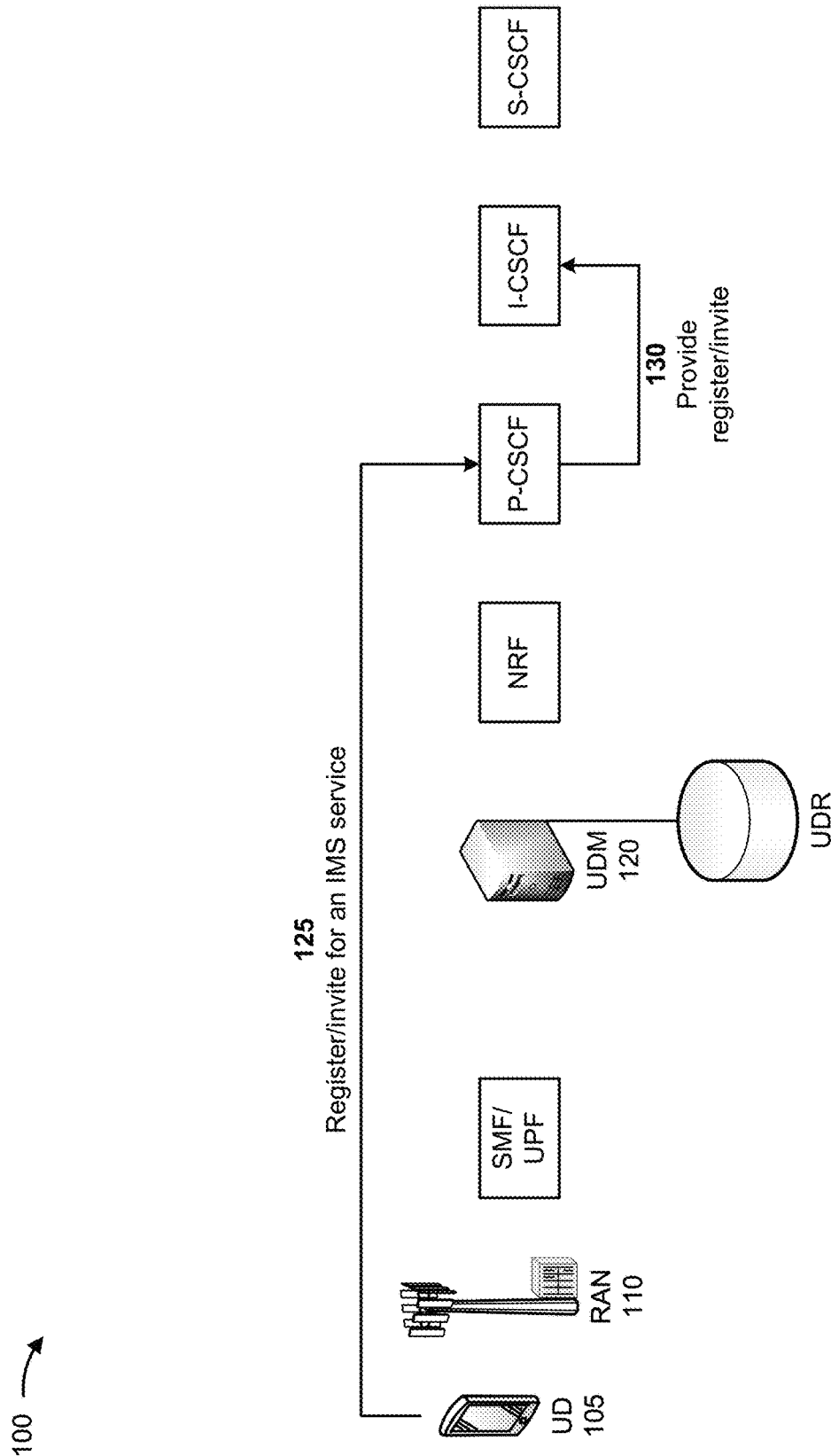

As shown in FIG. 1B, and by reference number 125, the P-CSCF may receive, from the user device 105, a request to register for an IMS service (e.g., an invite request). For example, the user device 105 may execute an IMS messaging application and the IMS messaging application may generate a request to register for an IMS messaging service. The user device 105 may provide the request to register for the IMS messaging service to the P-CSCF via the RAN 110. The P-CSCF may receive the request to register from the RAN 110. The P-CSCF may include a session initiation protocol (SIP) proxy that is a first point of contact for the user device 105 in the core network 115. All SIP traffic to and from the user device 105 may travel through the P-CSCF.

As further shown in FIG. 1B, and by reference number 130, the P-CSCF may provide the request to register for the IMS service to the I-CSCF. For example, the I-CSCF may enable requests to be routed to a correct S-CSCF and a correct UDM since there may be several S-CSCFs and/or UDMs within the core network 115. In order for the request to register to be routed to a correct UDM (e.g., the UDM 120), the P-CSCF may provide the request to register to the I-CSCF so that the I-CSCF may identify the correct UDM.

Figure 1C:
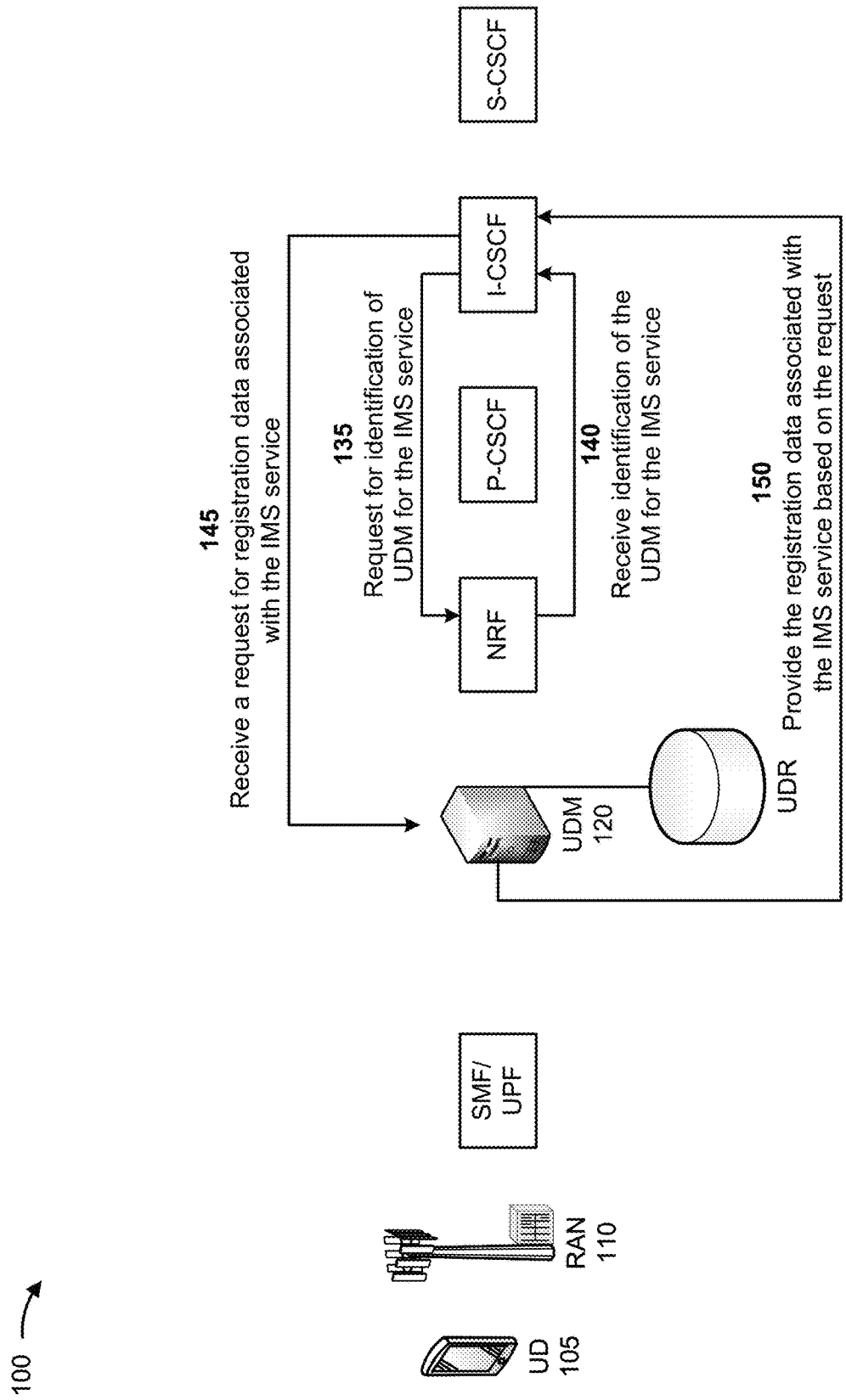

As shown in FIG. 1C, and by reference number 135, the I-CSCF may provide, to the NRF, a request for identification of a UDM for the IMS service. For example, the I-CSCF may generate the request for identification of the UDM for the IMS service based on receiving the request to register. In some implementations, the request for identification may include a request for identification of a network function (e.g., the UDM 120) that can facilitate provision of the IMS service to the user device 105. The I-CSCF may provide the request for identification to the NRF and the NRF may receive the request for identification.

As further shown in FIG. 1C, and by reference number 140, the I-CSCF may receive, from the NRF, the identification of the UDM 120 for the IMS service. For example, the NRF may determine the identification of the UDM 120 based on the request for identification. The NRF may identify the UDM 120 since the UDM 120 may be associated with the user device 105 and/or the IMS service requested by the user device 105. The NRF may provide the identification of the UDM 120 to the I-CSCF and the I-CSCF may receive the identification of the UDM 120 for the IMS service.

As further shown in FIG. 1C, and by reference number 145, the UDM 120 may receive, from the I-CSCF, a request for registration data associated with the IMS service. For example, the UDR may store the registration data associated with the IMS service. The registration data may include data identifying users (e.g., associated with user devices 105) that are registered to utilize the IMS service, user devices 105 (e.g., an international mobile subscriber identity (IMSI), a subscription permanent identifier (SUPI), a subscription concealed identifier (SUCI), a generic public subscription identifier (GPSI), and/or the like) that are registered to utilize the IMS service, and/or the like. The I-CSCF may generate the request for the registration data based on receiving the identification of the UDM 120 for the IMS service. The request may include a request for registration data associated with the user device 105 and the IMS service. The I-CSCF may provide the request for the registration data to the UDM 120, and the UDM 120 may receive the request for the registration data.

As further shown in FIG. 1C, and by reference number 150, the UDM 120 may provide, to the I-CSCF, the registration data associated with the IMS service based on the request. For example, the UDM 120 may retrieve, based on the request and from the UDR, the registration data associated with the IMS service and the user device 105. The UDM 120 may provide the registration data retrieved from the UDR to the I-CSCF.

Figure 1D:
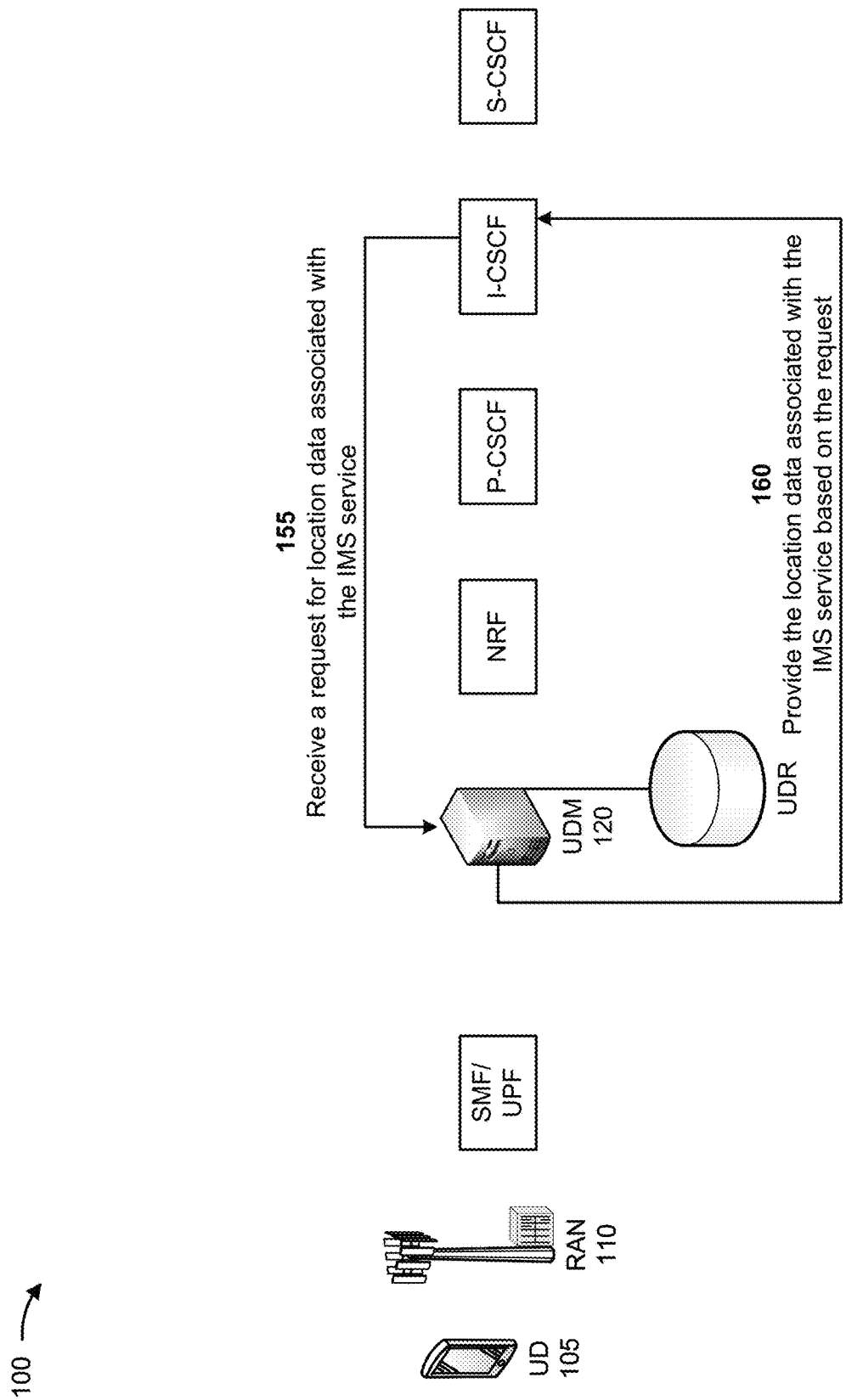

As shown in FIG. 1D, and by reference number 155, the UDM 120 may receive, from the I-CSCF, a request for location data associated with the IMS service. For example, the UDR may store the location data associated with the IMS service. The location data may include data identifying locations of user devices 105 that are registered to utilize the IMS service, a location of the IMS service, and/or the like. The I-CSCF may generate the request for the location data based on receiving the identification of the UDM 120 for the IMS service. The request for location data may include a request for location data associated with the IMS service and/or the user device 105. The I-CSCF may provide the request for the location data to the UDM 120, and the UDM 120 may receive the request for the location data.

As further shown in FIG. 1D, and by reference number 160, the UDM 120 may provide, to the I-CSCF, the location data associated with the IMS service based on the request for location data. For example, the UDM 120 may retrieve, based on the request for location data and from the UDR, the location data associated with the IMS service and the user device 105. The UDM 120 may provide the location data retrieved from the UDR to the I-CSCF.

Figure 1E:
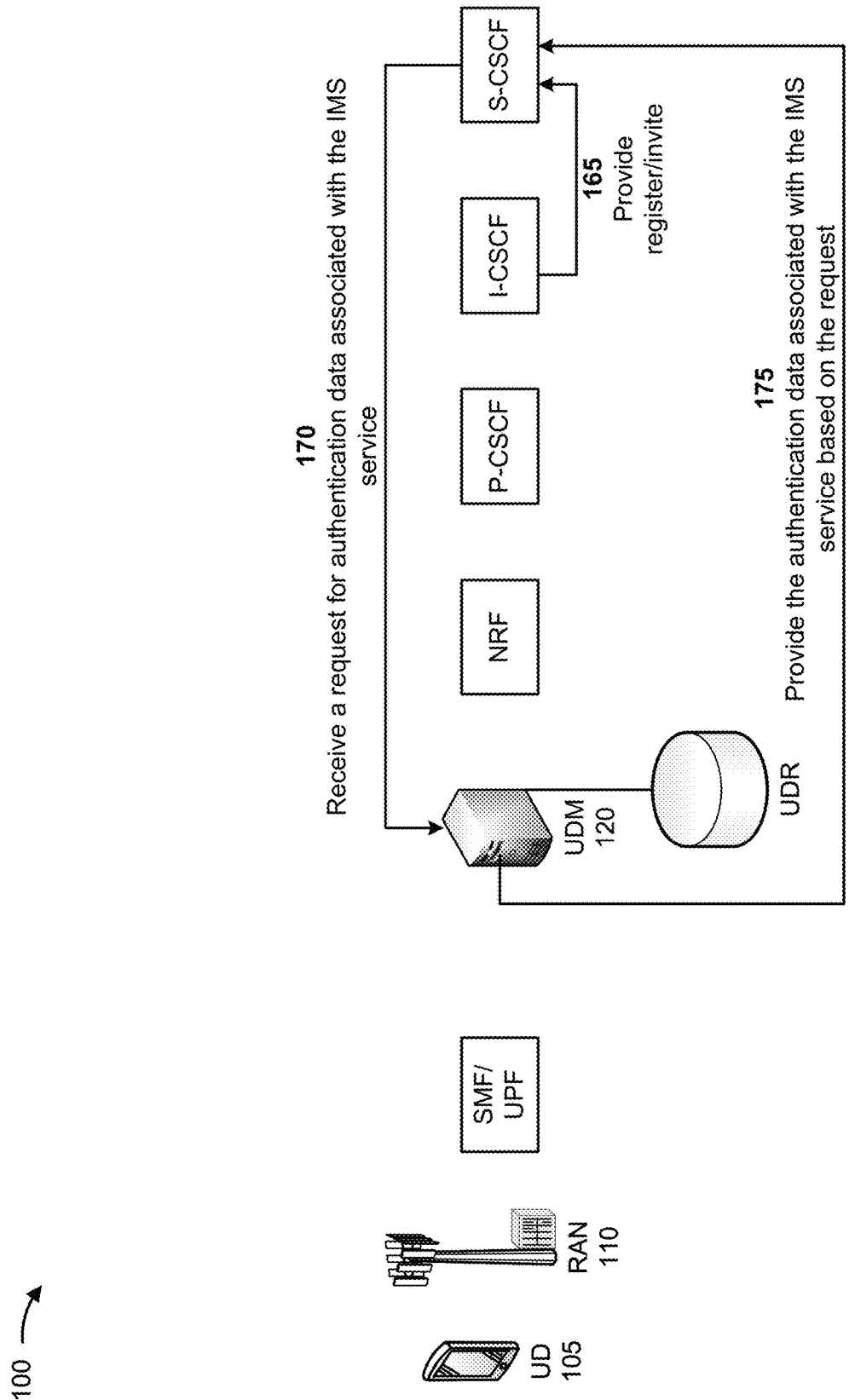

As shown in FIG. 1E, and by reference number 165, the I-CSCF may provide the request to register for the IMS service to the S-CSCF. For example, after receiving the registration data associated with the IMS service and the location data associated with the IMS service, the I-CSCF may provide the request to register for the IMS service to the S-CSCF. The I-CSCF may provide the request to register for the IMS service to the S-CSCF since the S-CSCF is a primary network device responsible for IMS session control. The user device 105 may be allocated to the S-CSCF for a duration of the IMS registration in order to facilitate routing of SIP messages as part of service establishment procedures.

As further shown in FIG. 1E, and by reference number 170, the UDM 120 may receive, from the S-CSCF, a request for authentication data associated with the IMS service. For example, the UDR may store the authentication data associated with the IMS service. The authentication data may include data identifying authentication credentials of users of user devices 105 that are registered to utilize the IMS service, authentication credentials of the IMS service, and/or the like. The S-CSCF may generate the request for the authentication data based on receiving the request to register for the IMS service from the I-CSCF. The request for authentication data may include a request for authentication data associated with the IMS service and/or the user device 105. The S-CSCF may provide the request for the authentication data to the UDM 120, and the UDM 120 may receive the request for the authentication data.

As further shown in FIG. 1E, and by reference number 175, the UDM 120 may provide, to the S-CSCF, the authentication data associated with the IMS service based on the request for authentication data. For example, the UDM 120 may retrieve, based on the request for authentication data and from the UDR, the authentication data associated with the IMS service and the user device 105. The UDM 120 may provide the authentication data retrieved from the UDR to the S-CSCF.

Figure 1F:
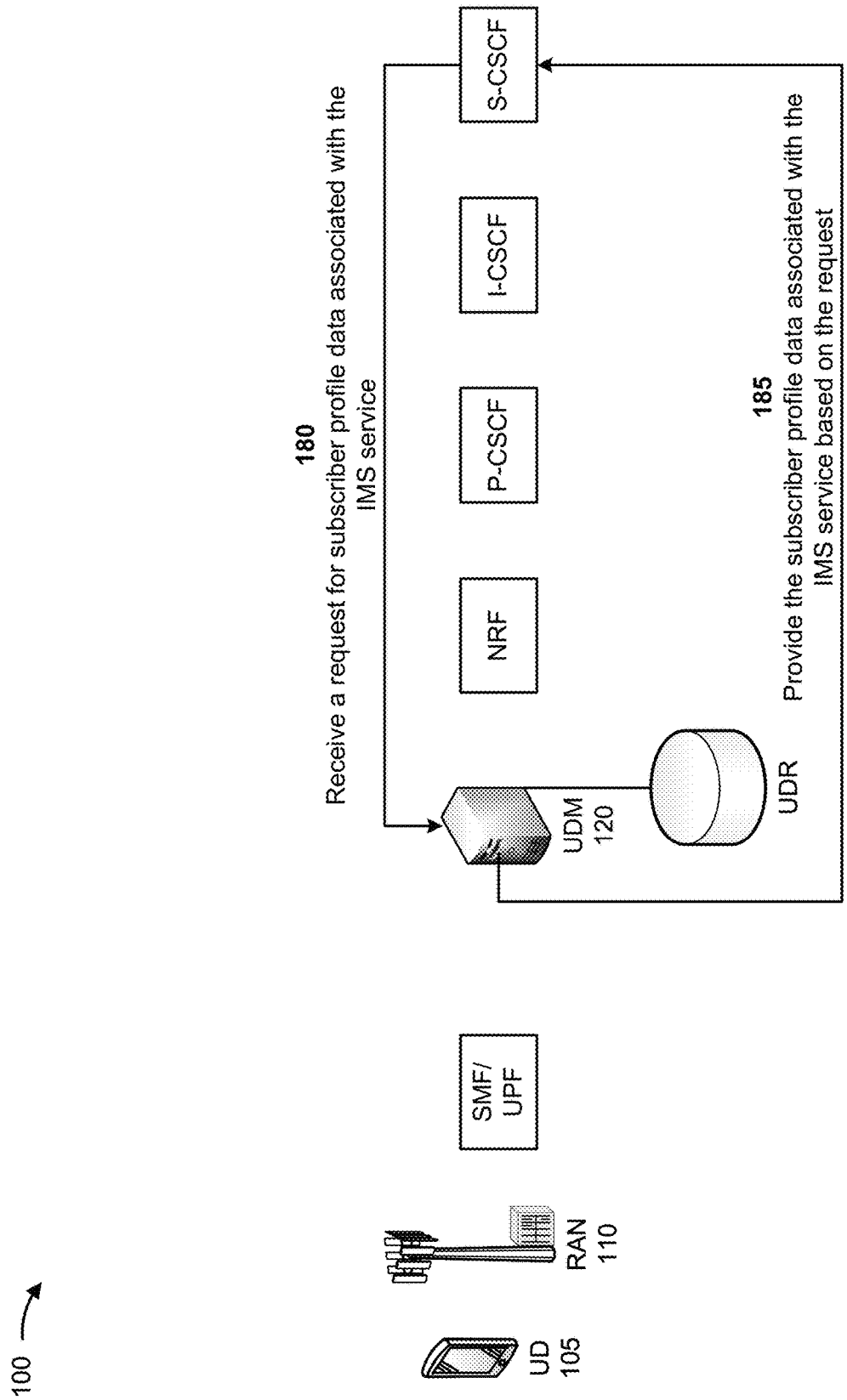

As shown in FIG. 1F, and by reference number 180, the UDM 120 may receive, from the S-CSCF, a request for subscriber profile data associated with the IMS service. For example, the UDR may store the subscriber profile data associated with the IMS service. The authentication data may include data identifying subscriber profiles of users of user devices 105 that are registered to utilize the IMS service, and/or the like. The S-CSCF may generate the request for the subscriber profile data based on receiving the request to register for the IMS service from the I-CSCF. The request for subscriber profile data may include a request for subscriber profile data associated with the IMS service and/or the user device 105. The S-CSCF may provide the request for the subscriber profile data to the UDM 120, and the UDM 120 may receive the request for the subscriber profile data.

As further shown in FIG. 1F, and by reference number 185, the UDM 120 may provide, to the S-CSCF, the subscriber profile data associated with the IMS service based on the request for subscriber profile data. For example, the UDM 120 may retrieve, based on the request for subscriber profile data and from the UDR, the subscriber profile data associated with the IMS service and the user device 105. The UDM 120 may provide the subscriber profile data retrieved from the UDR to the S-CSCF.

Figure 1G:
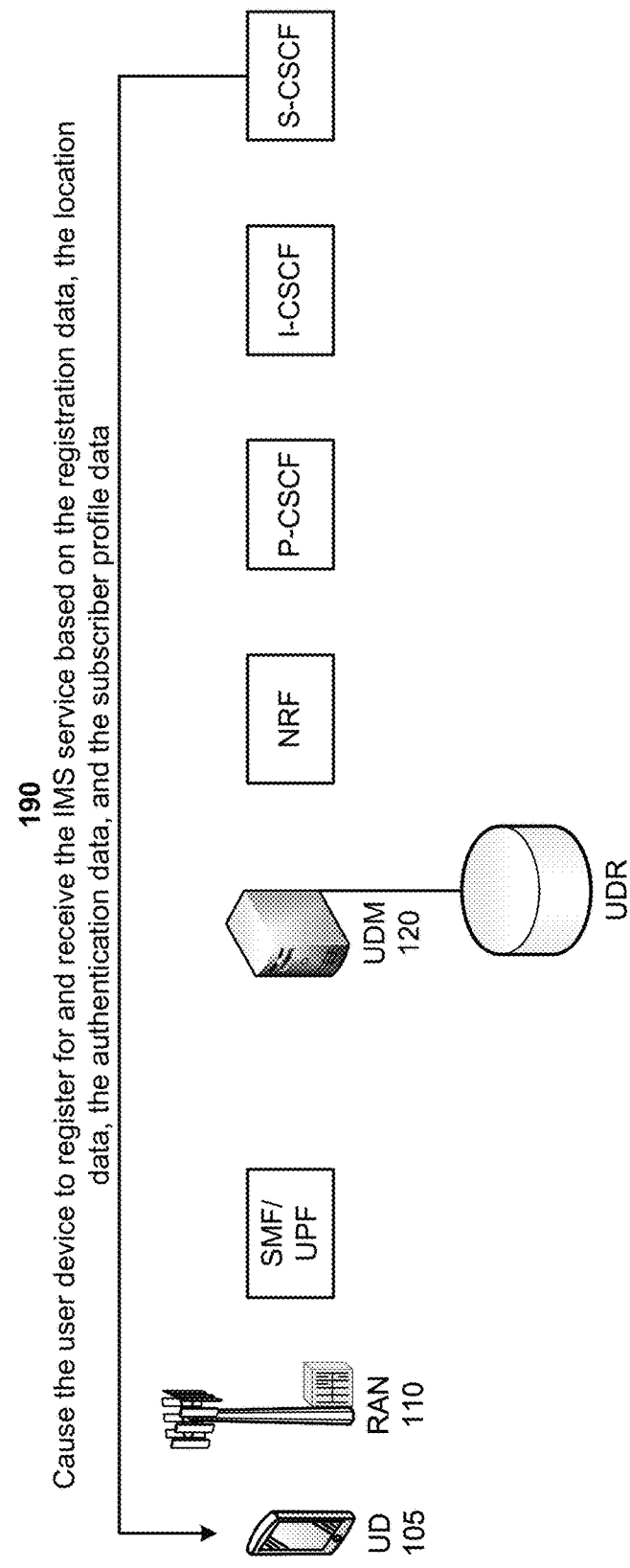

As shown in FIG. 1G, and by reference number 190, the S-CSCF may cause the user device 105 to register for and receive the IMS service based on the registration data, the location data, the authentication data, and the subscriber profile data. For example, the S-CSCF may utilize the registration data to register the user device 105 for accessing the IMS service. The S-CSCF may utilize the location data to identify a location of the user device and/or the UDM 120. The S-CSCF may utilize the authentication data to authenticate the user device 105 for accessing the IMS service. The S-CSCF may utilize the subscriber profile data to verify that the user device 105 is subscribed to the IMS service. After utilizing the registration data, the location data, the authentication data, and the subscriber profile data, the S-CSCF may cause the user device 105 to register for and receive the IMS service. For example, the S-CSCF may enable the user device 105 to utilize a VoIP service, an IMS messaging service, and/or the like.

In this way, the UDM 120 supports IMS services in 5G networks. For example, the UDM 120 may be enhanced to support an interface with the P/I/S-CSCF 250. The interface may be utilized to provide registration data, location data, authentication data, subscriber profile data, and/or the like, associated with an IMS service, to the P/I/S-CSCF 250. The P/I/S-CSCF 250 may utilize the registration data, the location data, the authentication data, the subscriber profile data, and/or the like to enable the user device 105 to register for and access the IMS service. Thus, the UDM 120 may conserve computing resources, networking resources, and/or other resources that would have otherwise been consumed by failing to provide IMS services to the user device 105 associated with a 5G network, providing and maintaining two types of HSSs for a 4G network and a 5G network, causing additional communications between the HSS and the UDM 120 to enable the P/I/S-CSCF 250 to communicate with the UDM 120, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
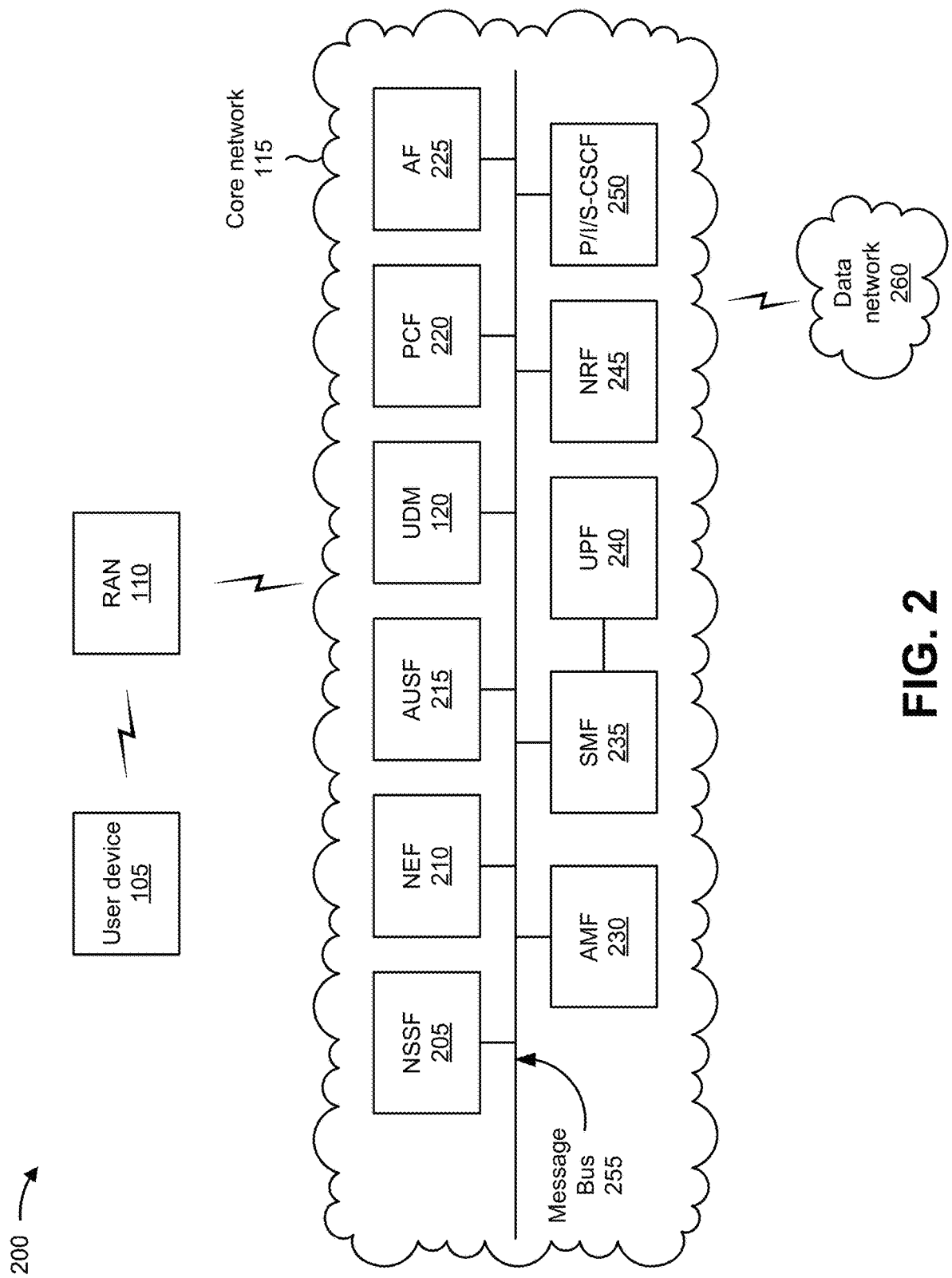
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the user device 105, the RAN 110, the core network 115, and a data network 260. Devices and/or networks of the example environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, a network exposure function (NEF) 210, an authentication server function (AUSF) 215, the UDM 120, a policy control function (PCF) 220, an application function (AF) 225, an access and mobility management function (AMF) 230, a session management function (SMF) 235, a user plane function (UPF) 240, an NRF 245, and a P/I/S-CSCF 250. These functional elements may be communicatively connected via a message bus 255. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the user device 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the user device 105 in the wireless telecommunications system.

The UDM 120 includes one or more devices that store user data and profiles in the wireless telecommunications system. The UDM 120 may be used for fixed access and/or mobile access in the core network 115.

The PCF 220 includes one or more devices that provide a policy framework that incorporates network slicing, roaming, packet processing, and/or mobility management, among other examples.

The AF 225 includes one or more devices that support application influence on traffic routing, access to the NEF 210, and/or policy control, among other examples.

The AMF 230 includes one or more devices that act as a termination point for non-access stratum (NAS) signaling and/or mobility management, among other examples.

The SMF 235 includes one or more devices that support the establishment, modification, and release of communication sessions in the wireless telecommunications system. For example, the SMF 235 may configure traffic steering policies at the UPF 240 and/or may enforce user equipment IP address allocation and policies, among other examples.

The UPF 240 includes one or more devices that serve as an anchor point for intraRAT and/or interRAT mobility. The UPF 240 may apply rules to packets, such as rules pertaining to packet routing, traffic reporting, and/or handling user plane QoS, among other examples.

The NRF 245 includes one or more devices that provide a single record of all network functions available in the core network 115, together with a profile of each network function and services supported by each network function. The NRF 245 may allow other network functions to subscribe to, and get notified about, registration in the NRF 245 of new network function instances. In addition to maintaining profiles, the NRF 245 also supports service discovery functions, enabling other network functions to obtain information regarding available network functions that can support specific services.

The P/I/S-CSCF 250 includes one or more devices that manage all signaling from an end user to services and other networks. The P/I/S-CSCF 250 may control both fixed and mobile IMSs, may allocate application servers, may establish emergency connections, and may control communication with other networks. The P/I/S/-CSCF 250 may include a proxy-CSCF (P-CSCF), an interrogating-CSCF (I-CSCF), and a serving-CSCF (S-CSCF).

The message bus 255 represents a communication structure for communication among the functional elements. In other words, the message bus 255 may permit communication between two or more functional elements.

The data network 260 includes one or more wired and/or wireless data networks. For example, the data network 260 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
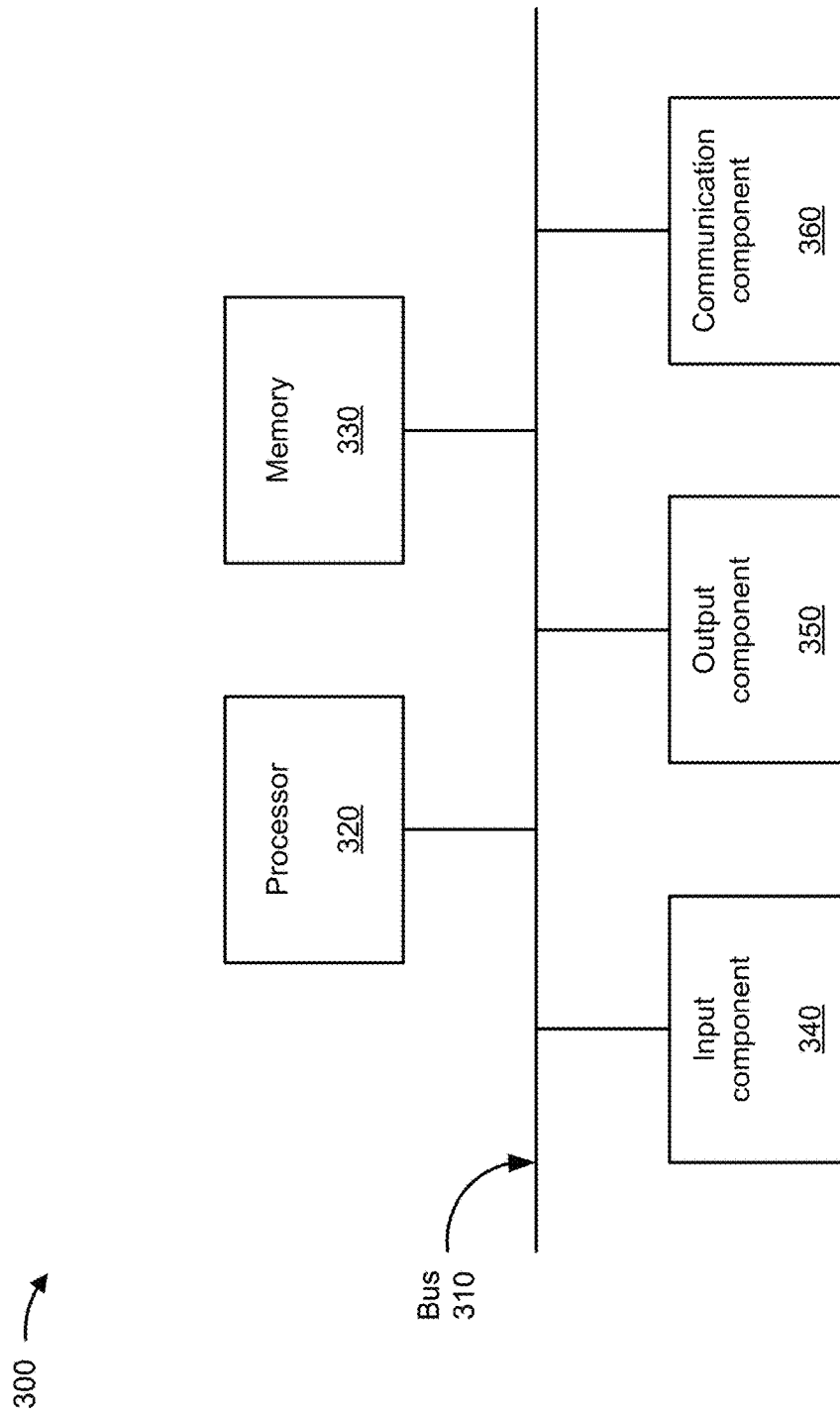
FIG. 3 is a diagram of example components of one or more devices of FIG. 2.

FIG. 3 is a diagram of example components of a device 300, which may correspond to the user device 105, the RAN 110, the UDM 120, the NSSF 205, the NEF 210, the AUSF 215, the PCF 220, the AF 225, the AMF 230, the SMF 235, the UPF 240, the NRF 25, and/or the P/I/S-CSCF 250. In some implementations, the user device 105, the RAN 110, the UDM 120, the NSSF 205, the NEF 210, the AUSF 215, the PCF 220, the AF 225, the AMF 230, the SMF 235, the UPF 240, the NRF 25, and/or the P/I/S-CSCF 250 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
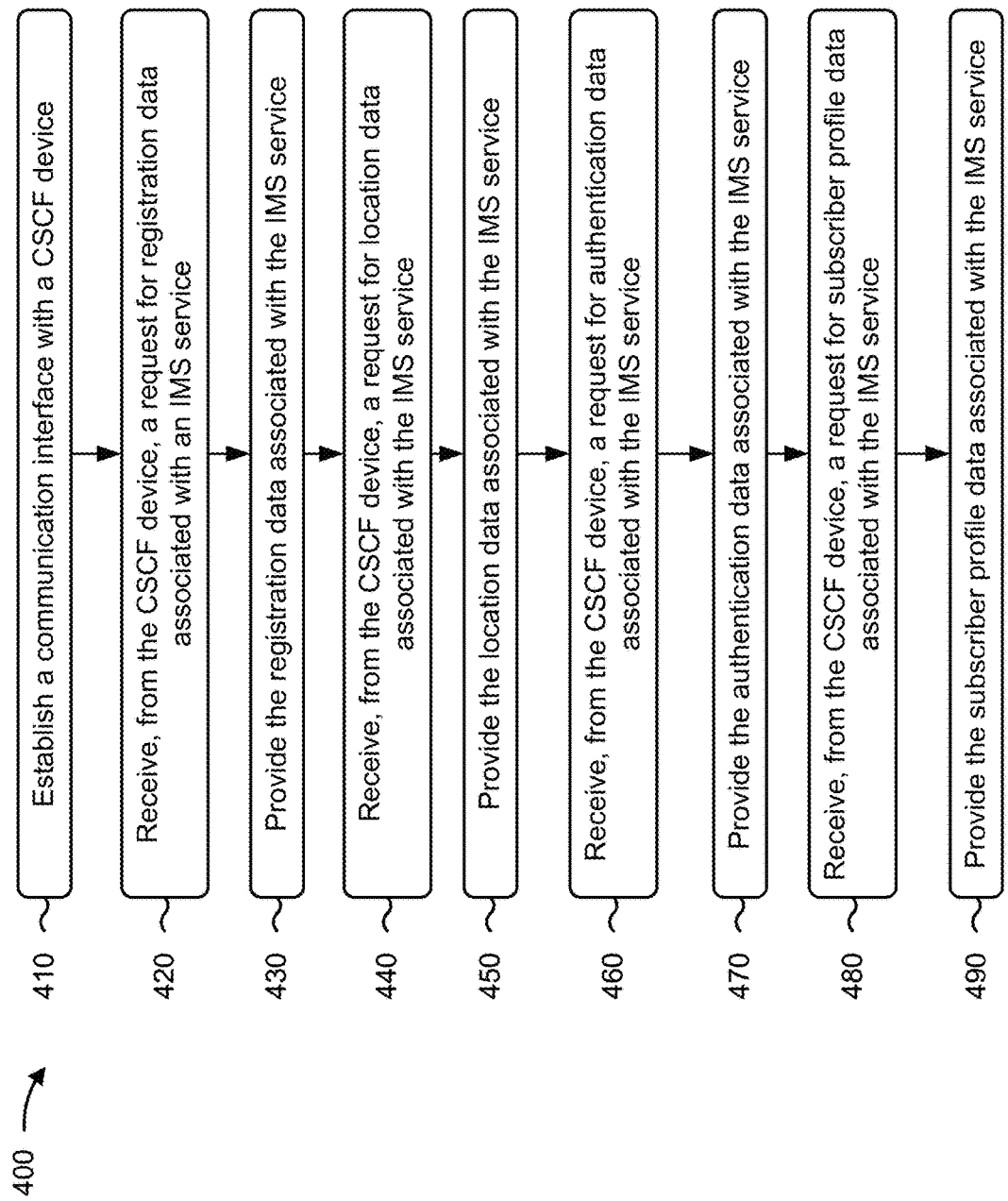
FIG. 4 is a flowchart of an example process for supporting IMS services in 5G networks.

FIG. 4 is a flowchart of an example process 400 for supporting IMS services in 5G networks. In some implementations, one or more process blocks of FIG. 4 may be performed by a network device (e.g., the UDM 120). In some implementations, one or more process blocks of FIG. 4 may be performed by another device or a group of devices separate from or including the network device, such as an NRF (e.g., the NRF 245), a CSCF (e.g., the P/I/S-CSCF 250), and/or the like. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include establishing a communication interface with a CSCF device (block 410). For example, the network device may establish a communication interface with a CSCF device, as described above. In some implementations, the CSCF device includes one or more of a proxy CSCF device, an interrogating CSCF device, or a serving CSCF device. In some implementations, the communication interface includes a service-based interface between the network device and the CSCF device.

As further shown in FIG. 4, process 400 may include receiving, from the CSCF device, a request for registration data associated with an IMS service requested by a user device (block 420). For example, the network device may receive, via the communication interface and from the CSCF device, a request for registration data associated with an IMS service requested by a user device, as described above. In some implementations, the registration data includes a subscription permanent identifier of a subscriber associated with the user device and a generic public subscription identifier associated with the IMS service. In some implementations, the CSCF device communicates with the network device based on the network device being identified as associated with the IMS service.

As further shown in FIG. 4, process 400 may include providing the registration data associated with the IMS service (block 430). For example, the network device may provide, to the CSCF device and based on the request for registration data, the registration data associated with the IMS service, as described above. In some implementations, providing the registration data associated with the IMS service includes retrieving, based on the request for registration data, the registration data associated with the IMS service from a data structure associated with the device, and providing the registration data retrieved from the data structure to the CSCF device.

As further shown in FIG. 4, process 400 may include receiving, from the CSCF device, a request for location data associated with the IMS service (block 440). For example, the network device may receive, via the communication interface and from the CSCF device, a request for location data associated with the IMS service, as described above.

As further shown in FIG. 4, process 400 may include providing the location data associated with the IMS service (block 450). For example, the network device may provide, to the CSCF device and based on the request for location data, the location data associated with the IMS service, as described above. In some implementations, providing the location data associated with the IMS service includes retrieving, based on the request for location data, the location data associated with the IMS service from a data structure associated with the device, and providing the location data retrieved from the data structure to the CSCF device.

As further shown in FIG. 4, process 400 may include receiving, from the CSCF device, a request for authentication data associated with the IMS service (block 460). For example, the network device may receive, via the communication interface and from the CSCF device, a request for authentication data associated with the IMS service, as described above.

As further shown in FIG. 4, process 400 may include providing the authentication data associated with the IMS service (block 470). For example, the network device may provide, to the CSCF device and based on the request for authentication data, the authentication data associated with the IMS service, as described above. In some implementations, providing the authentication data associated with the IMS service includes retrieving, based on the request for authentication data, the authentication data associated with the IMS service from a data structure associated with the device, and providing the authentication data retrieved from the data structure to the CSCF device.

As further shown in FIG. 4, process 400 may include receiving, from the CSCF device, a request for subscriber profile data associated with the IMS service (block 480). For example, the network device may receive, via the communication interface and from the CSCF device, a request for subscriber profile data associated with the IMS service, as described above. In some implementations, the network device is associated with a unified data repository that stores the registration data, the location data, the authentication data, and the subscriber profile data.

As further shown in FIG. 4, process 400 may include providing the subscriber profile data associated with the IMS service (block 490). For example, the network device may provide, to the CSCF device and based on the request for subscriber profile data, the subscriber profile data associated with the IMS service, as described above. In some implementations, the registration data, the location data, the authentication data, and the subscriber profile data cause the CSCF device to enable the user device to register for and receive the IMS service. In some implementations, providing the subscriber profile data associated with the IMS service includes retrieving, based on the request for subscriber profile data, the subscriber profile data associated with the IMS service from a data structure associated with the device, and providing the subscriber profile data retrieved from the data structure to the CSCF device.

In some implementations, the registration data is utilized to register the user device for accessing the IMS service, the location data includes a location of the network device, the authentication data is utilized to authenticate the user device for accessing the IMS service, and the subscriber profile data is utilized to verify that the user device is subscribed to the IMS service.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a network device, from a call session control function (CSCF) device, and based on a request associated with a user device accessing an Internet protocol (IP) multimedia subsystem (IMS) service, a request for at least one of registration data, associated with the IMS service, or location data, associated with the IMS service; and
    providing, by the network device and to the CSCF device, the at least one of the registration data or the location data,
        wherein the at least one of the registration data or the location data is associated with enabling the user device to access the IMS service.

2. The method of claim 1, further comprising:
    establishing a communication interface with the CSCF device,
        wherein at least one of receiving the request or providing the at least one of the registration data or the location data is via the communication interface.

3. The method of claim 1, wherein the registration data includes data identifying one or more users or one or more devices registered to utilize the IMS service.

4. The method of claim 1, wherein the location data includes data identifying at least one of:
    a location of the user device, or
    a location of the IMS service.

5. The method of claim 1, further comprising:
    receiving the request associated with the IMS service.

6. The method of claim 1, wherein the request is associated with the user device attempting to execute an IMS application associated with the IMS service.

7. The method of claim 1, further comprising:
    receiving, from the CSCF device, a request for at least one of authentication data, associated with the IMS service, or subscriber profile data, associated with the IMS service; and
    providing, to the CSCF device, the at least one of the authentication data or the subscriber profile data,
        wherein the at least one of the authentication data or the subscriber profile data is associated with enabling the user device to access the IMS service.

8. A network device, comprising:
    one or more processors configured to:
        establish a communication interface, with a call session control function (CSCF) device, associated with a user device accessing an Internet protocol (IP) multimedia subsystem (IMS) service;
        receive, from the CSCF device, a request for at least one of authentication data, associated with the IMS service, or subscriber profile data, associated with the IMS service; and
        provide, to the CSCF device, the at least one of the authentication data or the subscriber profile data,
            wherein the at least one of the authentication data or the subscriber profile data is associated with enabling the user device to access the IMS service.

9. The network device of claim 8, wherein the authentication data includes data identifying at least one of:
    an authentication credential of a user of the user device, or
    an authentication credential of the IMS service.

10. The network device of claim 8, wherein the subscriber profile data includes data identifying a subscriber profile of a user of the user device.

11. The network device of claim 8, wherein the communication interface includes a service-based interface between the network device and the CSCF device.

12. The network device of claim 8, wherein the network device is a united data management device.

13. The network device of claim 8, wherein the network device is associated with a unified data repository that stores the at least one of the authentication data or the subscriber profile data.

14. The network device of claim 8, wherein the one or more processors are further configured to:
    receive, from the CSCF device, a request for registration data associated with the IMS service; and
    provide, to the CSCF device, the registration data,
        wherein the registration data is associated with enabling the user device to access the IMS service.

15. A non-transitory computer-readable medium storing a set of instructions, the set of instructions comprising:
    one or more instructions that, when executed by one or more processors of a network device, cause the network device to:
        receive, from a call session control function (CSCF) device and via a communication interface between the CSCF device and the network device, and based on a request to access an Internet protocol (IP) multimedia subsystem (IMS) service, a request for at least two of registration data associated with the IMS service, location data associated with the IMS service, authentication data associated with the IMS service, or subscriber profile data associated with the IMS service; and
        provide, to the CSCF device and via the communication interface, the at least two of the registration data, the location data, the authentication data, or the subscriber profile data,
            wherein the at least two of the registration data, the location data, the authentication data, or the subscriber profile data are associated with enabling a user device to receive the IMS service.

16. The non-transitory computer-readable medium of claim 15, wherein the one or more instructions further cause the network device to:
    retrieve, based on the request for the at least at least two of the registration data, the location data, the authentication data, or the subscriber profile data, the at least two of the registration data, the location data, the authentication data, or the subscriber profile data via a data structure associated with the network device.

17. The non-transitory computer-readable medium of claim 15, wherein the communication interface includes a service-based interface between the network device and the CSCF device.

18. The non-transitory computer-readable medium of claim 15, wherein the one or more instructions further cause the network device to:
    establish the communication interface with the CSCF device.

19. The non-transitory computer-readable medium of claim 15, wherein the registration data includes data identifying one or more users or one or more devices registered to utilize the IMS service.

20. The non-transitory computer-readable medium of claim 15, wherein the location data includes data identifying at least one of:
　　a location of the user device, or
　　a location of the IMS service.

* * * * *